(12) United States Patent
Leitner et al.

(10) Patent No.: US 8,862,566 B2
(45) Date of Patent: Oct. 14, 2014

(54) SYSTEMS AND METHODS FOR INTELLIGENT PARALLEL SEARCHING

(71) Applicant: Equifax, Inc., Atlanta, GA (US)

(72) Inventors: Stephen Leitner, Alpharetta, GA (US); Kevin W. Manthey, Alpharetta, GA (US); Mark Burgess, Alpharetta, GA (US); Samuel Canfield, Alpharetta, GA (US)

(73) Assignee: Equifax, Inc., Atlanta, GA (US)

( * ) Notice: Subject to any disclaimer, the term of this patent is extended or adjusted under 35 U.S.C. 154(b) by 3 days.

(21) Appl. No.: 13/661,485

(22) Filed: Oct. 26, 2012

(65) Prior Publication Data

US 2014/0122455 A1 May 1, 2014

(51) Int. Cl.
*G06F 17/30* (2006.01)

(52) U.S. Cl.
CPC ................................ *G06F 17/30864* (2013.01)
USPC .......................................................... 707/706

(58) Field of Classification Search
CPC ................................................ G06F 17/30132
USPC ........................ 707/3, 692, 706; 709/204–206
See application file for complete search history.

(56) References Cited

U.S. PATENT DOCUMENTS

| | | | |
|---|---|---|---|
| 6,560,634 B1 * | 5/2003 | Broadhurst | 709/203 |
| 6,618,727 B1 | 9/2003 | Wheeler et al. | |
| 6,665,677 B1 | 12/2003 | Wotring et al. | |
| 6,728,706 B2 | 4/2004 | Aggarwal et al. | |
| 6,738,759 B1 | 5/2004 | Wheeler et al. | |
| 6,742,001 B2 | 5/2004 | Ripley | |
| 6,751,575 B2 | 6/2004 | Lenz et al. | |
| 6,795,819 B2 | 9/2004 | Wheeler et al. | |
| 6,829,606 B2 | 12/2004 | Ripley | |
| 6,839,714 B2 | 1/2005 | Wheeler et al. | |
| 6,853,997 B2 | 2/2005 | Wotring et al. | |
| 6,985,898 B1 | 1/2006 | Ripley et al. | |
| 7,007,174 B2 | 2/2006 | Wheeler et al. | |
| 7,010,539 B1 | 3/2006 | Haas et al. | |
| 7,020,651 B2 | 3/2006 | Ripley | |
| 7,188,107 B2 | 3/2007 | Moon et al. | |
| 7,283,998 B2 | 10/2007 | Moon et al. | |
| 7,386,554 B2 | 6/2008 | Ripley et al. | |

(Continued)

OTHER PUBLICATIONS

International Patent Application No. PCT/US2013/066911, "International Search Report and Written Opinion", mailed Feb. 7, 2014, 9 pages.

*Primary Examiner* — Etienne Leroux
(74) *Attorney, Agent, or Firm* — Kilpatrick Townsend & Stockton LLP (57) ABSTRACT

Systems and methods are provided for conducting intelligent parallel searches of data sources. A search engine receives a request to access target data that is stored in at least one of multiple data sources. Each data source has a candidate index. The search engine extracts inquiry parameters from the request. The inquiry parameters corresponds to sub-indices of respective general indices. Each general index includes an index of relationships between data from at least two of the data sources. Each sub-index includes a subset of the respective general index. The search engine performs parallel searches of the general indices common to the data sources. Each parallel search includes searching the sub-indices based on corresponding inquiry parameters for the sub-indices. The search engine performs additional parallel searches of the candidate indices based on results of the parallel searches. The search engine extracts an output from results of the additional parallel searches.

20 Claims, 8 Drawing Sheets

(56) References Cited

U.S. PATENT DOCUMENTS

| | | |
|---|---|---|
| 7,412,417 B1 | 8/2008 | Tuttle |
| 7,458,508 B1 | 12/2008 | Shao et al. |
| 7,562,814 B1 | 7/2009 | Shao et al. |
| 7,647,635 B2 | 1/2010 | Chen et al. |
| 7,686,214 B1 | 3/2010 | Shao et al. |
| 7,793,835 B1 | 9/2010 | Coggeshall et al. |
| 7,953,723 B1 | 5/2011 | Dutton et al. |
| 2002/0133476 A1 | 9/2002 | Reinhardt |
| 2005/0102270 A1 | 5/2005 | Risvik et al. |
| 2008/0059421 A1* | 3/2008 | Baartman et al. ............... 707/3 |
| 2009/0182724 A1 | 7/2009 | Day et al. |
| 2010/0005054 A1 | 1/2010 | Smith et al. |
| 2012/0254148 A1 | 10/2012 | Xiao et al. |
| 2012/0317082 A1* | 12/2012 | Anwar et al. ............... 707/692 |

\* cited by examiner

SYSTEMS AND METHODS FOR INTELLIGENT PARALLEL SEARCHING

TECHNICAL FIELD

This disclosure relates generally to computer hardware and methods implemented on such computer hardware, and more particularly to conducting intelligent parallel searches of multiple data sources.

BACKGROUND

Search applications and systems can provide search capabilities to locate and retrieve information in an online environment. Within industries dealing with financial services or other credit-related industries, search applications and systems can be required to search or otherwise access large amounts of data, such as terabytes of data, and return a result in less than a second.

Previous solutions for providing sub-second search capabilities of data sources can require that data be stored in a common format. Previous solutions do not provide intelligent searches of data sources including data in different formats in a manner that can provide a response in less than a second. Accordingly, such solutions can require data to be converted to a common or proprietary format in order to search or otherwise access the data.

Systems and methods are therefore desirable that can conduct intelligent parallel searches of multiple data sources.

SUMMARY

One example involves a search engine executed by a processor. The search engine receives a request to access target data that is stored in at least one of multiple data sources. Each data source has a candidate index. The search engine extracts inquiry parameters from the request. Each inquiry parameter corresponds to a sub-index of a respective general index. Each general index includes an index of relationships between data from at least two of the data sources. Each sub-index includes a subset of the respective general index. The search engine performs parallel searches of the general indices common to the data sources. Each parallel search includes searching sub-indices for the general indices based on corresponding inquiry parameters for the sub-indices. The search engine performs additional parallel searches of the candidate indices based on results of parallel searches. The search engine extracts an output based on results returned from the additional parallel searches.

This illustrative example is mentioned not to limit or define the invention, but to aid understanding thereof. Other aspects, advantages, and features of the present invention will become apparent after review of the entire description and Figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Computer-implemented systems and methods are disclosed for conducting intelligent parallel searches of data sources. Intelligent parallel searching can include utilizing relationships between data in different data sources to partition a search process into multiple search processes to be executed in parallel.

For example, a search engine executed on a computing system or other processing device can receive a search inquiry. Such a search inquiry can include a request to search or otherwise access data stored in at least one of multiple data sources. The search engine can extract inquiry parameters, such as index inquiry information and candidate inquiry information, from the search inquiry. Index inquiry information can include data corresponding to an index or sub-index for a data source. For example, if a first data source includes an index based on names and a second data source includes an index based on social security numbers, the search engine can extract index inquiry information such as a surname and a social security number from a search inquiry. Candidate inquiry information can include several data items corresponding to a specific individual or entity. For example, if a search inquiry includes a name, an address, and an income level, the search engine can extract candidate inquiry information usable for identifying a particular individual or entity, such as the name and address. The search engine can generate index search elements from the index inquiry information and candidate search elements from the candidate inquiry information. Search elements can include search terms formatted for use with a specific type of data source. The search engine can provide the index search elements to parallelized processes for searching data source indices. Each inquiry parameter can be intelligently mapped to a corresponding sub-index for a data source. The results returned by the parallelized searches of the data source indices can be merged such that results duplicating candidate search elements are removed. The search engine can provide the candidate search elements to parallelized processes for searching candidate indices. The parallelized searches of candidate indices can provide the search engine with pointers for retrieving candidate data from data sources in a medium-agnostic and data type-agnostic manner. The extracted candidate data, which can include target data corresponding to the search inquiry and relationships between target data, can be returned. The search engine can thus provide parallelized searching of data sources in a medium-agnostic manner such that target data can be returned milliseconds after receiving the request to access the target data.

As used herein, the term "search engine" can refer to one or more software modules configured to search for information in one or more data sources. A search engine can return search results, such as (but not limited to) target data. Target data can include any data stored in a data source. Examples of target data can include (but are not limited to) web pages, images, entity identification, etc.

As used herein, the term "data source" can refer to any combination of software modules and tangible computer-readable media configured to store data. Some aspects can include a data source that is a database that has a collection of data organized in a structured format. For example, a database can include one or more tables. Each table can have rows corresponding to data records and can have columns corresponding to properties of data records. Other aspects can include a data source that is a repository that has one or more files organized in one or more directories.

Some data sources can include structured data. Structured data can include data stored in fixed fields within a record or file. Examples of structured data can include (but are not limited to) relational databases and spreadsheets. Other data sources can include unstructured data. Unstructured data can include data that is not stored using fixed fields or locations. Unstructured data can include free-form text, such as (but not limited to) word processing documents, portable document format ("PDF") files, e-mail messages, blogs, web pages, etc. Other data sources can include semi-structured data. Semi-structured data can include data that is not organized using data models such as relational databases or other forms of data tables and that includes tags or other markers. Tags or other markers can delineate elements of records in a data source including semi-structured data. Tags or other markers can also identify hierarchical relationships between records in a data source including semi-structured data.

As used herein, the term "data source index" can refer to a file or other data identifying location for each record in one or more data sources. A data source index can identify a location for each record using a data pointer. A data pointer can identify a location in a physical computer-readable medium and/or a location in a logical data structure. For example, in a relational database, an index can include a copy of one or more columns of a table and a pointer mapping unique values for each row in a column to one or more records in the relational database. One non-limiting example of a data source index is a flat file. Another non-limiting example of a data source index is a hierarchical index.

As used herein, the term "sub-index" can refer to a portion of a data source index identifying locations for a subset of the data in a data source. A data source can include multiple sub-indices collectively including all information included in the data source index. A data source can include data describing which sub-index includes a respective portion of the index for the data source.

As used herein, the term "parallel" can refer to dividing a series of processes to be executed sequentially by one or more processors into multiple subsets of processes. Each subset of processes can be executed concurrently with each other subset of processes. Executing the subsets of processes concurrently can reduce the amount of processing time associated with executing the entire series of processes as compared to executing the entire series of processes sequentially.

As used herein, the term "candidate" can refer to a subset of data from a data source matching at least one inquiry parameter. The candidate can include a set of data to either be returned or excluded by a search engine based on completing the parallel searches.

As used herein, the term "candidate index" can refer to an index identifying records or other data associated with candidates from a given data source.

As used herein, the term "general index" can refer to an index identifying one or more relationships between data included in at least two data sources.

Additional or alternative features can include the search engine executing the parallel searches via a data service layer. The data services layer can include one or more software modules in a network protocol providing an abstraction layer between the functions executed by a processor to access data and the logical data structures and physical storage media used for storing the data. Executing the parallel searches via a data service layer can allow the search engine to be executed in a medium-agnostic manner.

As used herein, the term "medium-agnostic" can refer to executing a common set of operations to search or otherwise access data regardless of the type of storage media used to store data in the data sources. For example, a medium-agnostic operation can be used to search or otherwise access data stored on a first type of storage medium in the same manner as data stored on a second type of storage medium different from the first type. Examples of different storage media can include, but are not limited to, a dynamic random access memory ("DRAM") device, a non-volatile random-access memory ("NVRAM") device, a solid-state disk ("SDD"), etc.

Additional or alternative features can include the search engine performing searches in a data type-agnostic manner. As used herein, the term "data type-agnostic" can refer to executing a common set of operations to search or otherwise access data regardless of logical data structure used to store the data. The search engine can perform searches in a data type-agnostic manner by, for example, consuming data formats via plug-in software modules or other applications providing data layouts and data matching extensions.

Additional or alternative features can include the search engine providing an output that is usable for identity resolution. As used herein, the term "identity resolution" can include one or more processes executed to determine that an entity or individual identified in a first data source is the same as or associated with an entity or individual identified in a second data source. Examples of an output that is usable for identity resolution can include target data from two or more data sources and data describing the relationships between the target data from different data sources.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Figure 1:
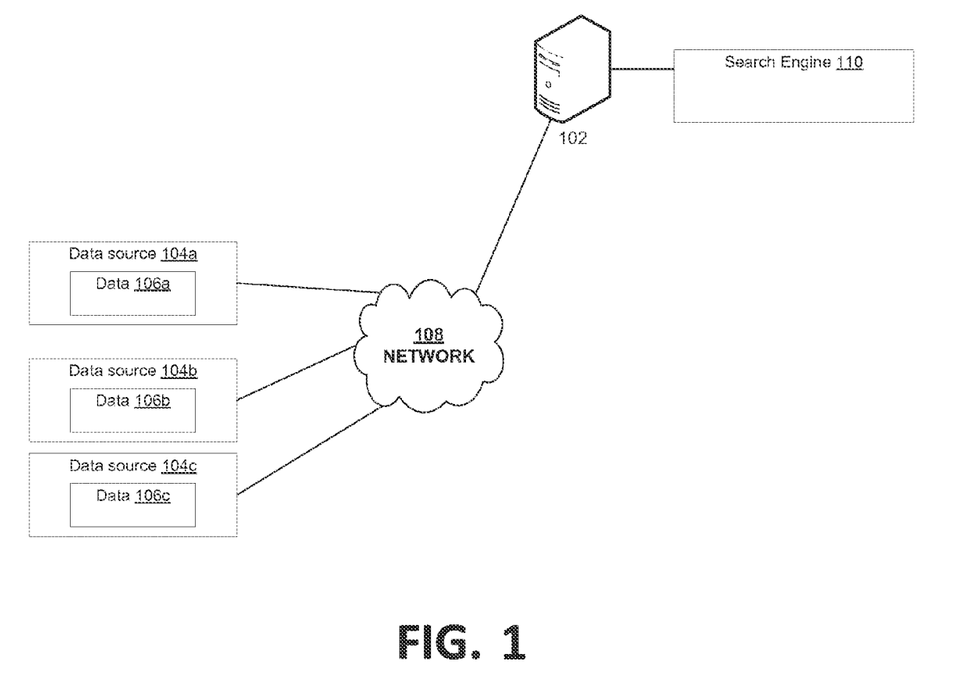
FIG. 1 is a network diagram illustrating a computing system having a search engine in communication with data sources via a network according to one feature.

Referring now to the drawings, FIG. 1 is a network diagram illustrating a computing system 102 in communication with data sources 104a-c via a network 108.

The computing system 102 can be any suitable computing system for hosting the search engine 110. Some aspects can include the computing system 102 being a single computing system, such as a server system. Other aspects can include the computing system 102 being a virtual server implemented using a number of computing systems connected in a grid or cloud computing topology. The search engine 110 executed at the computing system 102 can include one or more software modules for searching or otherwise accessing the data 106a-c respectively stored in the data sources 104a-c.

The data sources 104a-c can include one or more software modules and associated hardware for storing data. The data sources 104a-c can store data in any format. For example, the data source 104a can store data 106a that is structured data. The data source 104b can store data 106b that is unstructured data. The data source 104c can store data 106c that is semi-structured data. While three data sources are depicted in FIG. 1, the search engine 110 can search or otherwise access data stored in any number of data sources, including one.

Figure 2:
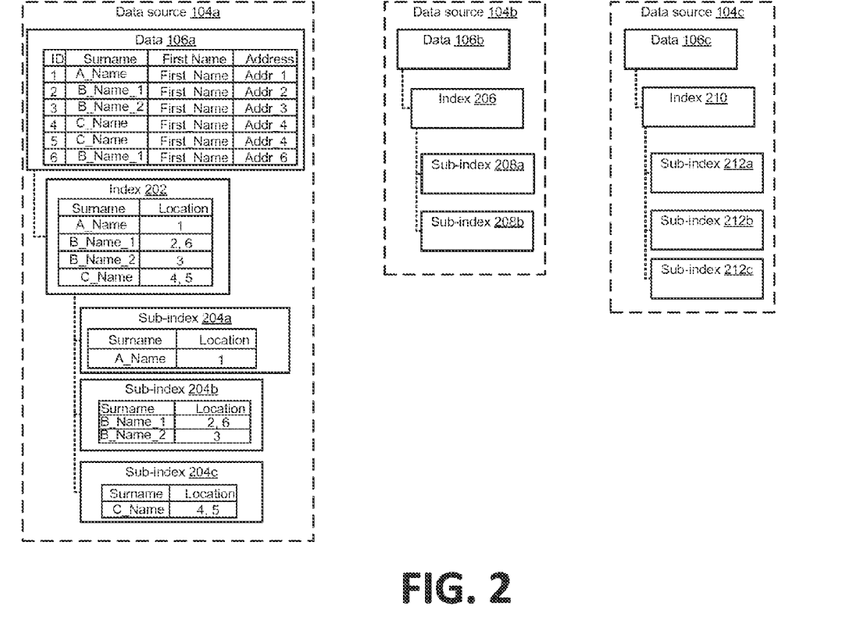
FIG. 2 is a block diagram illustrating data sources having indices and sub-indices according to one feature.

FIG. 2 is a block diagram illustrating the data sources 104a-c having indices and sub-indices.

Each of the data sources 104a-c can respectively include indices 202, 206, 210. Each of the indices 202, 206, 210 can be generated by extracting a portion of the data from the respective data sources 104a-c and associating each of the extracted data with one or more pointers identifying locations in a physical memory and/or a logical data structure in which records or other data including the extracted data can be found.

For example, for a data source 104a having records including a field for a surname of an individual, an index 202 can be generated by extracting each unique surname included in the data 106a of the data source 104a and associating each unique surname with one or more pointers to records or other data 106a in the data source 104a including the surname. As depicted in FIG. 2, the data 106a can include a table having records represented as rows with identification numbers corresponding to each record. The index 202 can include a list of unique surnames associated with pointers to the respective rows including the surname.

Another example can be a data source 104b having records including a field for a geographical address associated with an entity or individual, an index 206 can be generated by extracting each unique geographical address included in the data 106b of the data source 104b and associating each unique geographical address with one or more pointers to records or other data 106b in the data source 104b including the geographical address. Another example can be a data source 104c having records including a field for a social security number associated with an entity or individual, an index 206 can be generated by extracting each unique social security number included in the data 106c of the data source 104c and associating each unique social security number with one or more pointers to records or other data 106c in the data source 104c including the social security number.

Although each of the data sources 104a-c is depicted as having only a single index, a data source can include any number of indices. For example, a data source can include records having both surnames and geographical addresses. The data source can include a first index based on surnames and a second index based on geographical addresses.

Each of the indices 202, 206, 210 can include two or more sub-indices. Each sub-index can include a subset of the extracted data and associated pointers of the respective index with which the sub-index is associated. As depicted in FIG. 2, the index 202 can be associated with a sub-index 204a including surnames beginning with the letter A, a sub-index 204b including surnames beginning with the letter B, and a sub-index 204c including surnames beginning with the letter C.

The sub-indices can include any range of values. For example, an index 202 including surnames can include a sub-index 204a of surnames beginning with the letters A-G, a sub-index 204b of surnames beginning with the letters H-P, a sub-index 204c of surnames beginning with the letters P-Z. An index 206 including geographical addresses can include a sub-index 208a of geographical addresses beginning with street numbers 000 to 599 and a sub-index 208b of geographical addresses beginning with street numbers 600 to 999. An index 210 including social security numbers can include a sub-index 212a of social security numbers beginning with street numbers 000 to 299, a sub-index 212b of social security numbers beginning with street numbers 300 to 699, and a sub-index 212c of social security numbers beginning with street numbers 700 to 999.

Figure 3:
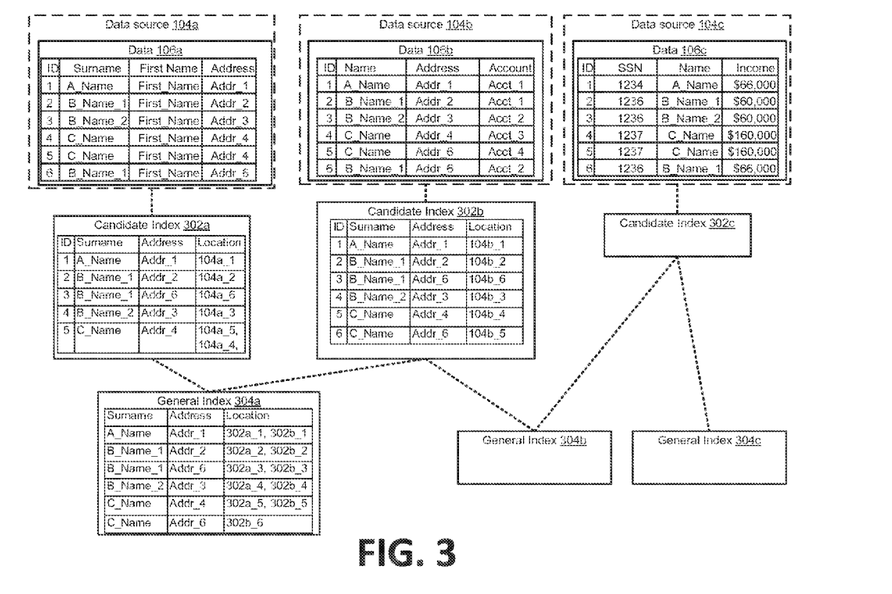
FIG. 3 is a block diagram illustrating data sources associated with candidate indices and general indices according to one feature.

FIG. 3 is a block diagram illustrating relationships among the data sources 104a-c, candidate indices 302a-c, and general indices 304a-c. The candidate indices 302a-c are associated with the general indices 304a-c.

Each of the data sources 104a-c can be associated with a respective candidate index 302a-c. Each of the candidate indices 302a-c can include an index of records of a respective source associated with a candidate. A candidate can include two or more data items corresponding to a specific individual or entity. For example, as depicted in FIG. 3, each of the candidate indices 302a, 302b can be used to resolve individuals or entities having a given name and address to specific locations in the respective data sources 104a, 104b. A search of candidate index 302a for an individual or entity having the Surname "C_Name" and the address "Addr_4" can be resolved to the fourth and fifth records of the data source 104a via pointers having values 104a_5, 104a_4. Each of the candidate indices 302a-c can include or be associated with two or more sub-indices similar to the sub-indices described above with respect to FIG. 2. Each sub-index of a respective candidate index can include a subset of the extracted data and associated pointers of the respective index with which the sub-index is associated.

Each of the candidate indices 302a-c can be associated with one or more of the general indices 304a-c. Each general index can include an index of relationships between data from one or more of the data sources 104a-c. The relationships between data can described in a general index by reference to a candidate index for a respective data source. For example, a general index 304a associated with the candidates indices 302a, 302b can include an entry for a surname associated with a geographical address. The entry including the surname associated with a geographical address can in turn be associated with one or more pointers to records in the respective candidate indices 302a, 302b. The general indices 304a-c can be shared among the data sources 104a-c. Sharing the general indices 304a-c among the data sources 104a-c can identify relationships between data in different data sources. As depicted in FIG. 3, the general index provides a list of pointers identifying a candidate index and row number of a respective candidate index in which each unique combination of surnames and geographical addresses can be found.

In another example, a general index 304b can include an entry for a social security number associated with a geographical address. The entry including the social security number associated with a geographical address can in turn be associated with one or more pointers to records or other data 106b, 106c in the respective data sources 104b, 104c.

Although FIG. 3 depicts three general indices, any number of general indices describing relationships between data included in multiple data sources can be used.

Figure 4:
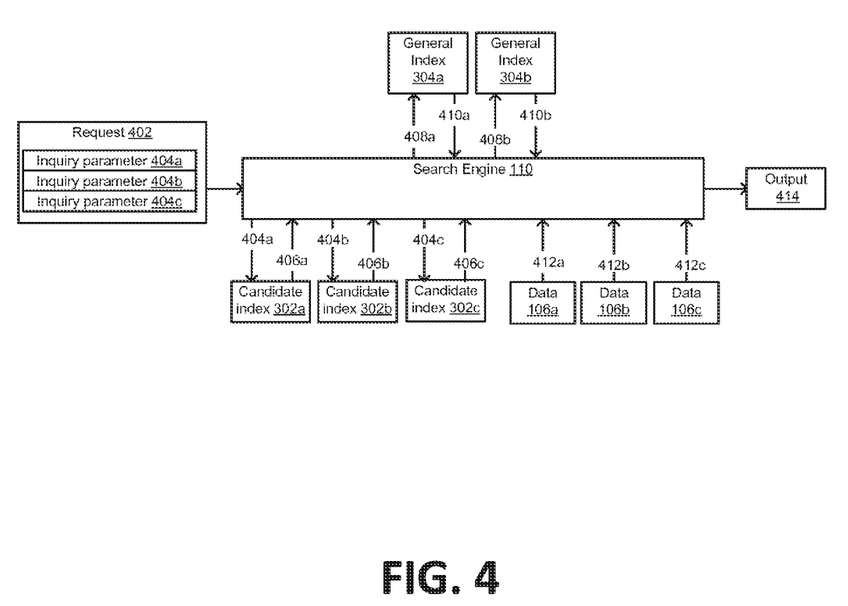
FIG. 4 is a block diagram illustrating a flow of communications between a search engine and data sources according to one feature.

FIG. 4 is a block diagram illustrating an example flow of communications between the search engine 110 and the data sources 104a-c.

The search engine 110 can receive a request 402 to search or otherwise access data stored in one or more of the data sources 104a-c. The request 402 can include inquiry parameters 404a-c. For example, a request 402 to search for an individual can include an inquiry parameter 404a that is a surname, an inquiry parameter 404b that is an address, and an inquiry parameter 404c that is a social security number. The search engine 110 can extract the inquiry parameters 404a-c from the request 402.

The search engine 110 can provide the inquiry parameters 404a-c to the data sources 104a-c. The inquiry parameters 404a-c can be provided to the data sources 104a-c to perform parallel searches of the data sources 104a-c. Some aspects can include the inquiry parameters 404a-c being provided to the data sources 104a-c as index search elements. Index search elements may be constructed from the inquiry parameters 404a-c via hash key indexing. The index search elements can be used for relationship processing. The index search elements can be shared among the data sources 104a-c to generate inter-source relationships. An inter-source relationship can include a relationship between records or other data in different data sources generated based on relationships between data within a data source. Inter-source relationships can be stored using one or more general indices.

For example, a data source 104a can include a relationship between a table including addresses and a table including surnames. A data source 104b can include a relationship between a table including account numbers and a table including surnames. Elements of the indices 202, 206 can be shared such that records of the data source 104a including surnames can be associated with records of the data source 104b including surnames. A resulting inter-source relationship can describe addresses in the data source 104a being related to account numbers in the data source 104b via the surnames included in the data sources 104a, 104b.

Some aspects can include the search engine 110 having a plug-in software module or other application that is executable to format the inquiry parameters 404a-c for use with the respective data sources 104a-c. For example, the inquiry parameter 404a provided to a data source 104a including structured data, such as a relational database, may be formatted as a database query. The inquiry parameter 404c provided to a data source 104c including semi-structured data, such as documents organized in hierarchy via tags, may be formatted to retrieve data from a hierarchical data structure. Formatting the inquiry parameters 404a-c for use with the respective data sources 104a-c can allow a search engine 110 to be used with multiple data sources having data in native formats. Doing so can obviate a requirement the data from the multiple data sources to be converted to a common format for use with the search engine 110.

The search engine 110 can retrieve candidate data 406a-c based on the parallel searches of the respective candidate indices 302a-c of the data sources 104a-c. The parallel searches can be executed using the candidate indices 302a-c or sub-indices of the candidate indices 302a-c. The candidate data 406a-c can include any of the data from the data sources 104a-c matching or otherwise corresponding to an inquiry parameter provided to a respective data source. For example, a search using an inquiry parameter 404a that is a surname can retrieve candidate data 406a that includes all records including the surname. A search of the data source 104a using an inquiry parameter 404b that is an address can retrieve candidate data 406b that includes all records including the address or a part of the address, such as a street name or zip code. A search of the data source 104b using an inquiry parameter 404b that is an address can retrieve candidate data 406b that includes all records including the address or a part of the address, such as a street name or zip code. A search of the data source 104c using an inquiry parameter 404c that is a social security number can retrieve candidate data 406c that includes all records including the social security number. The candidate data 406a-c can additionally or alternatively include relationships between data from at least two the data sources 104a-c matching or otherwise corresponding to an inquiry parameter provided to a respective data source.

The search engine 110 can search the general indices 304a, 304b using de-duplicated candidate data 408a, 408b. For example, duplicate records in candidate data 406a, 406b can be removed such that the candidate data 408a, 408b includes a set of unique records or other data. The search engine 110 can retrieve one or more pointers 410a, 410b from the general indices 304a, 304b based on the search of the general indices 304a, 304b.

The search engine 110 can retrieve data subsets 412a-c from the data 106a-c using the one or more pointers 410a, 410b. The data subsets 412a-c can include one or more records or other data from one or more of the data sources 104a-c. The data subsets 412a-c can also include relationships among the data retrieved from one or more of the data sources 104a-c.

The search engine 110 can provide the output 414 that includes, or is generated from, the data subsets 412a-c. The output 414 can include data and relationships between data. The output 414 can be usable for identity resolution. Some aspects can include applying a matching plug-in module or other application to the output 414. The matching plug-in module or other application can analyze the relationships between data included in the output 414 to determine that the output 414 includes or does not include the target data of the request 402, such as the identity of an individual.

Figure 5:
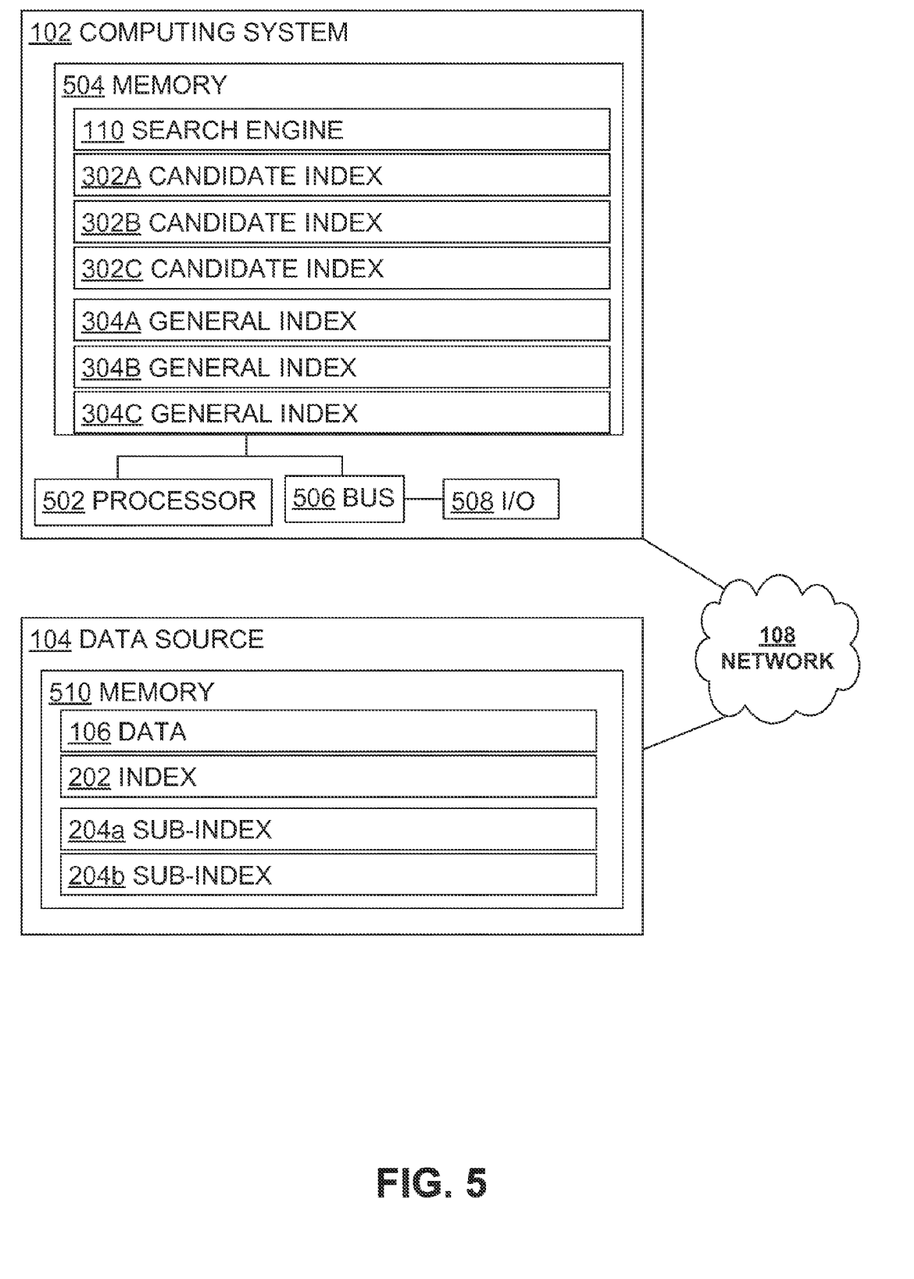
FIG. 5 is a block diagram depicting an example of computing systems for implementing certain features.

Any suitable computing system 102 can be used to implement the features described in FIGS. 2-3. FIG. 5 is a block diagram depicting examples of computing systems for implementing certain features. The examples of computing systems include the computing system 102 and a data source 104 communicating via the network 108.

The computing system 102 includes a computer-readable medium such as a processor 502 communicatively coupled to a memory 504 that can execute computer-executable program instructions and/or accesses information stored in the memory 504. Each of the processor 502 may include a microprocessor, an ASIC, a state machine, or other processor, and can be any of a number of computer processors. Such a processor can include, or may be in communication with, a computer-readable medium which stores instructions that, when executed by the processor, cause the processor to perform the steps described herein. The data source 104 includes computer-readable medium such as a memory 510. Data 106, the index 202, and the sub-indices 204a, 204b can be stored in the memory 510.

A computer-readable medium may include, but is not limited to, an electronic, optical, magnetic, or other storage device capable of providing a processor with computer-readable instructions. Other examples can include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing system 102 may also include a number of external or internal devices such as a mouse, a CD-ROM, DVD, a keyboard, a display, audio speakers, one or more microphones, or any other input or output devices. The computing system 102 can receive input from and provide output to external device via an input/output ("I/O") interface 508. A bus 506 can communicatively couple the components of the computing system 102.

FIG. 5 also illustrates the search engine 110 and candidate indices 302a-c and general indices 304a-c included in the memory 504 of the computing system 102. The search engine 110 can include one or more software modules configuring the processor 502 for searching or otherwise accessing the data 106 of the data source 104. As is known to one of skill in the art, the search engine 110 may be resident in any suitable computer-readable medium and execute on any suitable processor. Some aspects can include the search engine 110 and the candidate indices 302a-c and general indices 304a-c residing in memory at the computing system 102. Other aspects can include one or more of the search engine 110 and the candidate indices 302a-c and general indices 304a-c being accessed by the computing system 102 from a remote location via the network 108.

Figure 6:
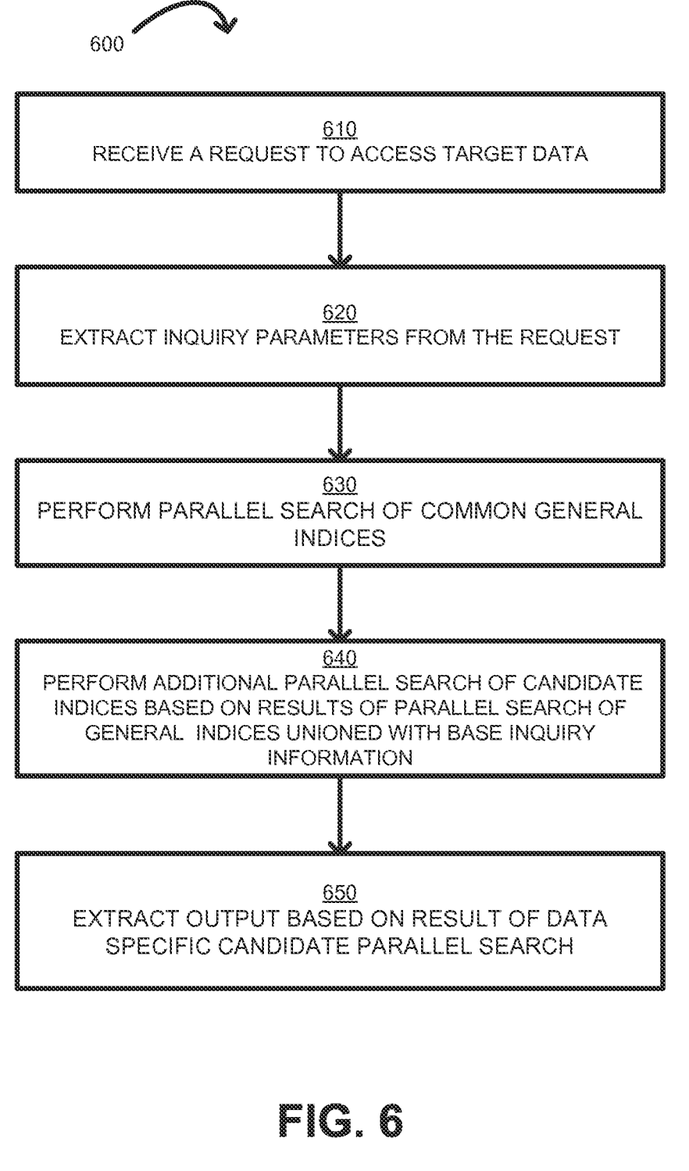
FIG. 6 is a flow chart illustrating an example method for conducting intelligent parallel searching of the data sources according to one feature.

FIG. 6 is a flow chart illustrating an example method 600 for conducting intelligent parallel searching of the data sources 104a-c. For illustrative purposes, the method 600 is described with reference to the system implementations depicted in FIGS. 1-4. Other implementations, however, are possible.

The method 600 involves the search engine 110 receiving a request 402 to access target data, as shown in block 610. The target data can be stored in at least one of the data sources 104a-c. Some aspects can include the request 402 being received as or generated from input received via the I/O interface 508. Other aspects can include the request 402 being received as or generated from a message from an application in communication with the search engine 110 via the computing system 102, such as a calling application.

The method 600 further involves the search engine 110 extracting the inquiry parameters 404a-c from the request 402, as shown in block 620. Extracting the inquiry parameters 404a-c can include identifying one or more inquiry parameters included in the request 402 that can be used to search or otherwise access the data from each data source. Each inquiry parameter can correspond to an index for a respective data source or a candidate index for a respective data source. For example, the search engine 110 can extract a surname, a geographical address, and a social security number from a request 402 and provide the surname to a data source 104a having an index 202 including surnames, provide the geographical address to a data source 104b having an index 206 including geographical addresses, and provide the social security number to a data source 104c having an index 210 including social security numbers. Extracting the inquiry parameters can additionally or alternatively include formatting the inquiry parameters 404a-c for use with the respective data sources 104a-c, as discussed in detail with respect to FIG. 7.

The method 600 further involves the search engine 110 performing parallel searches of the general indices 304a-c common to the data sources 104a-c, as shown in block 630. Each parallel search can include searching a respective sub-index of a respective general index based on a corresponding inquiry parameter. For example, an inquiry parameter that is a surname "Doe" can be used to search a sub-index of surnames beginning with the letters A-F. Performing the parallel searches can include searching multiple sub-indices of the general indices. Performing the parallel searches can include searching multiple sub-indices associated with different general indices and/or data sources, searching multiple sub-indices associated within each general index and/or data source, or a combination of both. Some aspects can include the search engine 110 executing the parallel searches via a data service layer.

The method 600 further involves the search engine 110 performing one or more additional parallel searches of the candidate indices 302a-c based on results of the parallel searches of general indices 304a, 304b unioned with the inquiry parameters 404a-c from the request 402, as shown in block 640. Performing the union of the general indices 304a-c with the inquiry information from the request 402 can involve excluding duplicate candidate data returned from the parallel searches, as described above with respect to FIG. 3.

The method 600 further involves the search engine 110 extracting an output 414 based on results returned from the one or more additional parallel searches of the candidate indices 302a-c, as shown in block 650. The output 414 can be extracted from candidate data 406a-c returned from the additional parallel searches. The output 414 can include the target data from at least two of the data sources and a relationship between the target data from the at least two data sources. The target data and the relationship between the target data can be usable for identity resolution. Some aspects can include a plug-in output formatting service or other application formatting the output 414 such that the output 414 can be provided to the application providing the request 402.

Figure 7:
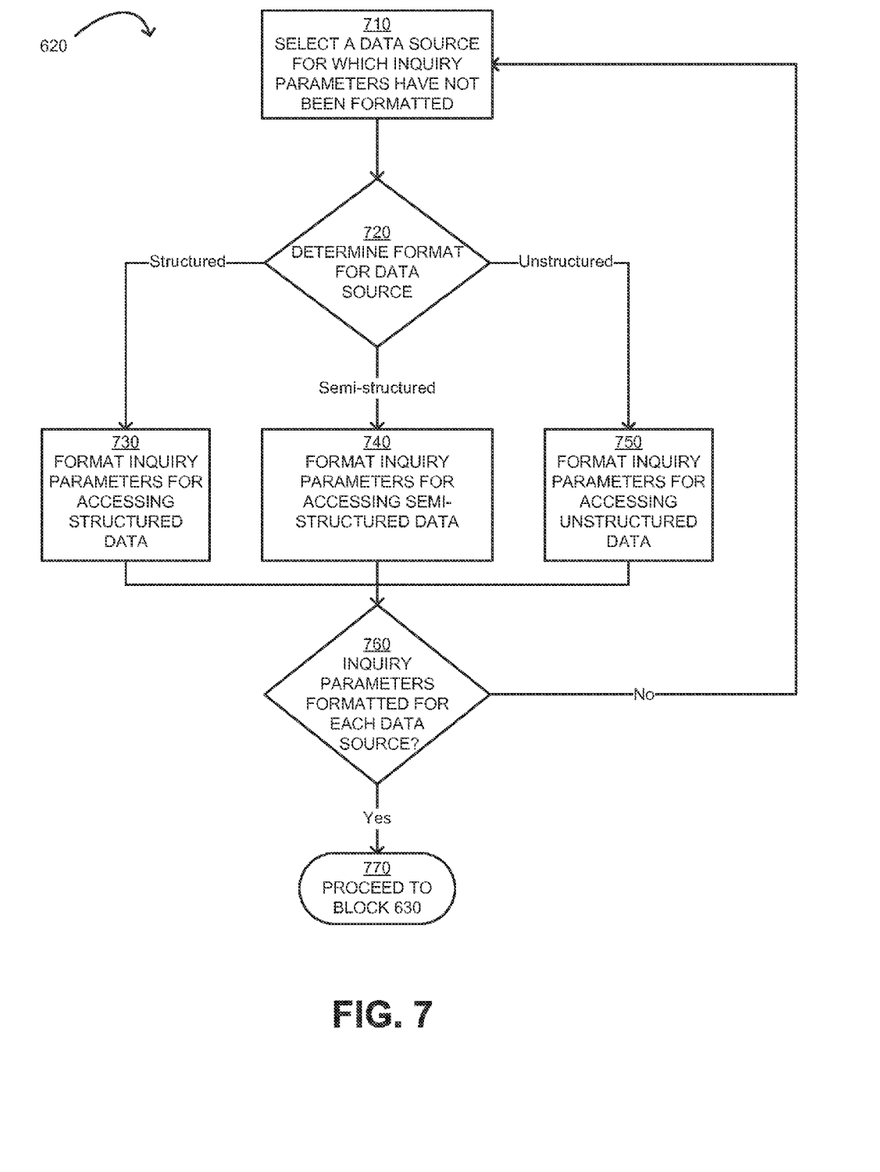
FIG. 7 is a flow chart illustrating an example method for formatting inquiry parameters for use with data sources according to one feature.

FIG. 7 is a flow chart illustrating an example method for formatting the inquiry parameters 404a-c for use with the respective data sources 104a-c.

At block 710, the search engine 110 selects one of the data sources 104a-c for which inquiry parameters have not been formatted, as shown in block 710.

At block 720, the search engine 110 determines a format for a data source, as shown in block 720. Some aspects can include the search engine 110 determining a format for a data source based on metadata included in the data source and describing the format for the data source. Other aspects can include the search engine 110 retrieving sample data from the data source and analyzing the data to determine the format for a data source.

If a data source includes structured data, the search engine 110 formats one or more inquiry parameters for accessing structured data, as shown in block 730. Formatting inquiry parameters for accessing structured data can include generating queries for accessing data in relational databases based on the inquiry parameters.

If a data source includes semi-structured data, the search engine 110 formats one or more inquiry parameters for accessing semi-structured data, as shown in block 740. Formatting inquiry parameters for accessing semi-structured data can include generating queries for accessing data in hierarchical data structure based on the inquiry parameters.

If a data source includes unstructured data, the search engine 110 formats a first inquiry parameter for accessing unstructured data, as shown in block 750.

The search engine 110 can determine if inquiry parameters have been formatted for each of the data sources 104a-c, as shown in block 760. If inquiry parameters have been formatted for each of the data sources 104a-c, the method can return to block 710. If inquiry parameters have been formatted for each of the data sources 104a-c, the method can terminate and proceed to block 630 of method 600, as shown in block 770.

Figure 8:
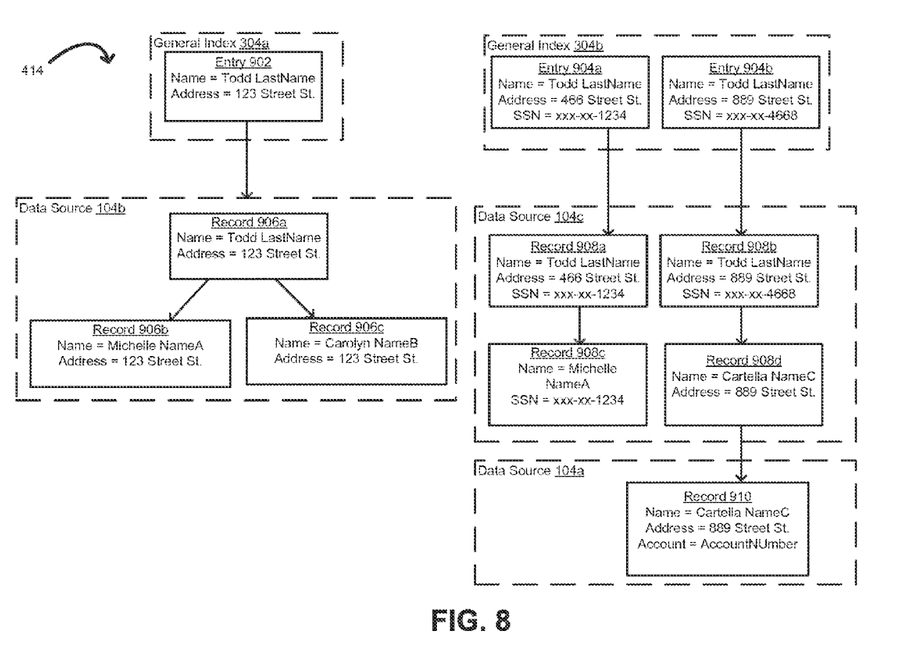
FIG. 8 is a block diagram illustrating an example output of intelligent parallel searching performed by a search engine.

FIG. 8 is a block diagram illustrating an example output 414 of intelligent parallel searching performed by a search engine 110. The output 414 can include the records returned as the result of a search of the candidate indices 302a-c for the individual "Todd LastName" and the relationships between those records.

A search of general index 304a can yield an entry 902 for an individual "Todd LastName" having an address "123 Street St." The entry 902 can provide a pointer to a record 906a in data source 104b having a name field with the value "Todd LastName" and an address field with the value "123 Street St." The relationships between records based on the address field within the data source 104b can also be used to select the related records 906b, 906c having an address field with the value "123 Street St." relating the records 906b, 906c to record 906a.

A search of general index 304b can yield entries 904a, 904b. The entry 904a can describe an individual "Todd LastName" having an address "456 Street St." and a social security number "xxx-xx-1234." The entry 904b can describe an individual "Todd LastName" having an address "889 Street St." and a social security number "xxx-xx-4568." The entry 904a can provide a pointer to a record 908a in data source 104c having a name field with the value "Todd LastName," an address field with the value "456 Street St.", and a social security number field with the value "xxx-xx-1234." The relationships between records based on the social security number field within the data source 104c can also be used to select the related record 908c having a social security number field with the value "xxx-xx-1234." The entry 904b can provide a pointer to a record 908b in data source 104c having a name field with the value "Todd LastName," an address field with the value "789 Street St.", and a social security number field with the value "xxx-xx-4568." The relationships between records based on the address field within the data source 104c can also be used to select the related record 908d having an address field with the value "789 Street St." The relationships between data sources 104a, 104b based on address field can be used to select the related record 910 having an address field with the value "789 Street St."

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more features of the present subject matter. Any suitable programming, scripting, or other type of language or combinations of languages may be used to implement the teachings contained herein in software to be used in programming or configuring a computing device.

Features of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   receiving, by a search engine executed by a processor device, a request to access target data, wherein the target data is stored in at least one of a plurality of data sources, each of the plurality of data sources having a respective candidate index;
   accessing, by the search engine, a plurality of general indices, wherein each of the plurality of general indices comprises a respective index of relationships between data from at least two of the plurality of data sources;
   extracting, by the search engine, a plurality of inquiry parameters from the request, wherein each of the extracted plurality of inquiry parameters corresponds to a respective sub-index from the plurality of general indices, wherein each sub-index from the plurality of general indices comprises a respective subset of at least one respective general index from the plurality of general indices;
   performing, by the search engine, parallel searches of the plurality of general indices, wherein each parallel search comprises searching a respective sub-index from the plurality of general indices based on a respective inquiry parameter from the extracted plurality of inquiry parameters that corresponds to the respective sub-index;
   performing, by the search engine, additional parallel searches of the candidate indices for the plurality of data sources based on the extracted plurality of inquiry parameters and at least one additional inquiry parameter obtained from the parallel searches of the plurality of general indices; and
   extracting, by the search engine, an output based on results returned from the additional parallel searches of the candidate indices.

2. The method of claim 1, wherein a first data source of the plurality of data sources comprises structured data and wherein a second data source of the plurality of data sources comprises unstructured data, wherein performing the additional parallel searches comprises:

formatting a first one of the additional parallel searches for accessing the structured data using a first one of the extracted plurality of inquiry parameters or the at least one additional inquiry parameter; and formatting a second one of the additional parallel searches for accessing the structured data using a second one of the extracted plurality of inquiry parameters or the at least one additional inquiry parameter.

3. The method of claim 2, wherein the search engine executes the parallel searches via a data service layer.

4. The method of claim 1, wherein returning the output comprises returning the target data from at least two data sources of the plurality of data sources and a relationship between the target data from the at least two data sources.

5. The method of claim 4, wherein the target data and the relationship between the target data are usable for identity resolution, wherein the identity resolution comprises determining that a first entity or individual identified in a first one of the plurality of data sources is the same as or associated with a second entity or individual identified in a second one of the plurality of data sources.

6. The method of claim 1, wherein executing the parallel searches of the plurality of data sources comprises executing a first search of a first data source having a first type of storage medium and executing a second search of a second data source having a second type of storage medium different from the first type of storage medium.

7. The method of claim 1, wherein executing the additional parallel searches of the candidate indices further comprises excluding duplicate candidate data returned from the parallel searches.

8. The method of claim 1, wherein the at least one additional inquiry parameter is non-duplicative of the extracted plurality of inquiry parameters and wherein at least one of the additional parallel searches comprises searching a respective one of the candidate indices to which the at least one additional inquiry parameter corresponds and to which none of the extracted plurality of inquiry parameters corresponds.

9. The method of claim 8, further comprising obtaining the at least one additional inquiry parameter from the parallel searches by performing operations comprising:

determining from at least one of the plurality of general indices that first data from a one of the plurality of data sources is related to second data from a second one of the plurality of data sources; and obtaining the at least one additional inquiry parameter from the second data based on (i) the second data being related to the first data and (ii) the first data corresponding to at least some of the extracted plurality of inquiry parameters.

10. The method of claim 9, wherein obtaining the at least one additional inquiry parameter from the second data comprises selecting the second data as the at least one additional inquiry parameter.

11. The method of claim 1, wherein a first set of results returned by searching the plurality of data sources with the extracted plurality of inquiry parameters is smaller than a second set of results returned by searching the plurality of data sources with the extracted plurality of inquiry parameters unioned with the at least one additional inquiry parameter.

12. A non-transitory computer-readable medium embodying program code executable by a computer system, the non-transitory computer-readable medium comprising:

program code for receiving a request to access target data, wherein the target data is stored in at least one of a plurality of data sources, each of the plurality of data sources having a respective candidate index;

program code for accessing a plurality of general indices, wherein each of the plurality of general indices comprises a respective index of relationships between data from at least two of the plurality of data sources;

program code for extracting a plurality of inquiry parameters from the request, wherein each of the extracted plurality of inquiry parameters corresponds to a respective sub-index from the plurality of general indices, wherein each sub-index from the plurality of general indices comprises a respective subset of at least one respective general index from the plurality of general indices;

program code for performing parallel searches of the plurality of general indices, wherein each parallel search comprises searching a respective sub-index from the plurality of general indices based on a respective inquiry parameter from the extracted plurality of inquiry parameters that corresponds to the respective sub-index;

program code for performing additional parallel searches of the candidate indices for the plurality of data sources based on the extracted plurality of inquiry parameters and at least one additional inquiry parameter obtained from the parallel searches of the plurality of general indices; and program code for extracting an output based on results returned from the additional parallel searches of the candidate indices.

13. The non-transitory computer-readable medium of claim 12, wherein a first data source of the plurality of data sources comprises structured data and wherein a second data source of the plurality of data sources comprises unstructured data.

14. The non-transitory computer-readable medium of claim 12, wherein the program code for returning the output comprise program code for returning the target data from at least two data sources of the plurality of data sources and a relationship between the target data from the at least two data sources.

15. The non-transitory computer-readable medium of claim 12, wherein the program code for executing the parallel searches of the plurality of data sources comprises program code for executing a first search of a first data source having a first type of storage medium and executing a second search of a second data source having a second type of storage medium different from the first type of storage medium.

16. A system comprising:

a non-transitory computer-readable medium configured to store instructions providing a search engine;

a processor configured to execute the instructions stored in the non-transitory computer-readable medium to execute the search engine by performing operations comprising:

receiving a request to access target data, wherein the target data is stored in at least one of a plurality of data sources, each of the plurality of data sources having a respective candidate index;

accessing, by the search engine, a plurality of general indices, wherein each of the plurality of general indices comprises a respective index of relationships between data from at least two of the plurality of data sources;

extracting a plurality of inquiry parameters from the request, wherein each of the extracted plurality of inquiry parameters corresponds to a respective sub-index from the plurality of general indices, wherein each sub-index from the plurality of general indices comprises a respective subset of at least one respective general index from the plurality of general indices;

performing parallel searches of the plurality of general indices, wherein each parallel search comprises searching a respective sub-index from the plurality of general indices based on a respective inquiry parameter from the extracted plurality of inquiry parameters that corresponds to the respective sub-index;

performing additional parallel searches of the candidate indices for the plurality of data sources based on the extracted plurality of inquiry parameters and at least one additional inquiry parameter obtained from the parallel searches of the plurality of general indices; and extracting an output based on results returned from the additional parallel searches of the candidate indices.

17. The system of claim 16, wherein a first data source of the plurality of data sources comprises structured data and wherein a second data source of the plurality of data sources comprises unstructured data.

18. The system of claim 16, wherein returning the output comprises returning the target data from at least two data sources of the plurality of data sources and a relationship between the target data from the at least two data sources.

19. The system of claim 18, wherein the target data and the relationship between the target data are usable for identity resolution.

20. The system of claim 16, wherein executing the parallel searches of the plurality of data sources comprises executing a first search of a first data source having a first type of storage medium and executing a second search of a second data source having a second type of storage medium different from the first type of storage medium.

* * * * *

UNITED STATES PATENT AND TRADEMARK OFFICE
CERTIFICATE OF CORRECTION

PATENT NO. : 8,862,566 B2  
APPLICATION NO. : 13/661485  
DATED : October 14, 2014  
INVENTOR(S) : Stephen Leitner et al.

Page 1 of 1

It is certified that error appears in the above-identified patent and that said Letters Patent is hereby corrected as shown below:

On the title page, item (72), in "Inventors", in column 1, line 2, Delete "Kevin" and insert -- Keith --, therefor.

In the Specification

In column 4, line 26, Delete "("SDD")," and insert -- ("SSD"), --, therefor.

Signed and Sealed this
First Day of September, 2015

Michelle K. Lee
*Director of the United States Patent and Trademark Office*